(12) United States Patent
Joshi et al.

(10) Patent No.: US 9,903,510 B2
(45) Date of Patent: Feb. 27, 2018

(54) HANGER FOR MOUNTING CABLES

(71) Applicant: CommScope Technologies LLC, Hickory, NC (US)

(72) Inventors: Aviral Joshi, Chicago, IL (US); Ronald A. Vaccaro, Shorewood, IL (US); Taig S. Rajpal, Chicago, IL (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/335,614

(22) Filed: Oct. 27, 2016

(65) Prior Publication Data

US 2017/0122460 A1    May 4, 2017

Related U.S. Application Data

(60) Provisional application No. 62/250,254, filed on Nov. 3, 2015.

(51) Int. Cl.
 *F16B 15/00*    (2006.01)
 *F16B 45/00*    (2006.01)
 (Continued)

(52) U.S. Cl.
 CPC ............ *F16L 3/1058* (2013.01); *F16B 15/00* (2013.01); *F16B 45/00* (2013.01); *F16L 3/1066* (2013.01);
 (Continued)

(58) Field of Classification Search
 CPC ....... F16L 3/13; F16L 3/12; F16L 3/24; F16L 3/127; F16L 3/1033; F16L 3/1041;
 (Continued)

(56) References Cited

U.S. PATENT DOCUMENTS 3,237,905 A * 3/1966 Baker .................. H05K 7/12
 174/138 G
3,444,596 A * 5/1969 Soltysik ............... F16B 21/086
 248/73
(Continued)

FOREIGN PATENT DOCUMENTS

EP    1020672 A1    7/2000
JP    2012-222986    11/2012

OTHER PUBLICATIONS

International Search Report and Written Opinion for corresponding PCT Application No. PCT/US2016/023939, dated Aug. 24, 2016, 11 pages.
(Continued)

*Primary Examiner* — Stanton L Krycinski
*Assistant Examiner* — Taylor L Morris
(74) *Attorney, Agent, or Firm* — Myers Bigel, P.A.

(57) ABSTRACT

A cable hanger for securing a cable to a supporting structure having an aperture includes: a base panel having opposed ends; a pair of arms, each of the arms attached to a respective end of the base panel and having a free end; and a pair of locking projections, each of the locking projections attached to a respective free end of the arms. The arms and locking projections are configured to spread apart to enable insertion of a cable into a space between the arms, and the locking projections are configured to be inserted into the aperture of the supporting structure. The cable hanger further includes: a pair of tabs extending inwardly from each arm into the space between the arms; and a gripping finger extending generally perpendicularly from each tab and generally tangentially to an outer surface of the cable.

14 Claims, 4 Drawing Sheets

(51) Int. Cl.
*F16L 3/22* (2006.01)
*F16L 3/10* (2006.01)
*H02G 3/30* (2006.01)
*G02B 6/44* (2006.01)
*H02G 3/32* (2006.01)
*E21F 17/02* (2006.01)
*F16L 3/00* (2006.01)
*F16L 3/24* (2006.01)
*F16L 3/08* (2006.01)
*F16L 3/13* (2006.01)
*F16L 3/12* (2006.01)
*F16L 3/127* (2006.01)

(52) U.S. Cl.
CPC ............. *F16L 3/1075* (2013.01); *F16L 3/221* (2013.01); *F16L 3/222* (2013.01); *G02B 6/4471* (2013.01); *H02G 3/30* (2013.01); *H02G 3/32* (2013.01); *F16L 3/12* (2013.01); *F16L 3/127* (2013.01); *F16L 3/13* (2013.01)

(58) Field of Classification Search
CPC ......... F16L 3/1008; F16L 3/10; F16L 55/035; F16L 3/222; F16L 3/1075; F16L 3/221; H02G 3/32; H02G 3/30; B60R 16/0215
USPC ...... 248/67.7, 73, 74.1, 74.2, 74.4, 58, 68.1, 248/71, 72; 24/16 PB, 339, 453, 484, 24/543, 545
See application file for complete search history.

(56) References Cited

U.S. PATENT DOCUMENTS

| | | | | |
|---|---|---|---|---|
| 3,501,117 A * | 3/1970 | Soltysik | ................... | F16L 3/13 24/339 |
| 3,913,187 A * | 10/1975 | Okuda | ................. | F16L 3/1075 24/16 PB |
| 5,230,496 A * | 7/1993 | Shillington | ......... | A61M 5/1418 24/487 |
| 5,669,590 A * | 9/1997 | Przewodek | ............. | F16L 3/221 248/68.1 |
| 6,257,530 B1 * | 7/2001 | Tsai | ........................ | F16L 3/127 248/73 |
| 6,460,813 B1 * | 10/2002 | Gretz | .................... | F16L 3/1025 248/62 |
| 6,899,305 B2 * | 5/2005 | Korczak | ................... | F16L 3/12 248/68.1 |
| 7,097,142 B1 * | 8/2006 | Schmidt | .................... | F16L 3/12 248/68.1 |
| 7,201,351 B2 * | 4/2007 | Stigler | ................. | F16L 3/1008 24/16 PB |
| 7,293,745 B2 * | 11/2007 | Catapano | ................. | H02G 3/30 248/61 |
| 7,360,745 B2 * | 4/2008 | Nikayin | ................. | H02G 3/126 174/58 |
| 7,712,708 B2 * | 5/2010 | Clark | .................. | B60R 16/0215 24/115 R |
| 8,191,836 B2 | 6/2012 | Korczak | | |
| 8,439,316 B2 * | 5/2013 | Feige | ........................ | F16L 3/13 248/71 |
| 9,306,380 B2 | 4/2016 | Vaccaro | | |
| 2002/0066833 A1 | 6/2002 | Ferrill et al. | | |
| 2005/0109887 A1 | 5/2005 | Catapano | | |
| 2005/0109890 A1 | 5/2005 | Korczak et al. | | |
| 2009/0230256 A1 | 9/2009 | Widlacki et al. | | |
| 2010/0000763 A1 | 1/2010 | Stansberry, Jr. | | |
| 2011/0226913 A1 | 9/2011 | Feige | | |
| 2015/0047147 A1 | 2/2015 | Vaccaro | | |

OTHER PUBLICATIONS

International Search Report and Written Opinion Corresponding to International Application No. PCT/US2016/059050; dated Jan. 18, 2017; 14 Pages.

* cited by examiner ized in the art. In the drawings, like numbers refer to like elements throughout. Thicknesses and dimensions of some components may be exaggerated for clarity.

HANGER FOR MOUNTING CABLES

RELATED APPLICATION

The present application claims priority from and the benefit of U.S. Provisional Patent Application No 62/250,254, filed Nov. 3, 2016, the disclosure of which is hereby incorporated herein in its entirety.

FIELD OF THE INVENTION

This invention relates generally to devices for supporting cables and in particular, to hangers for securing cables to support structures.

BACKGROUND OF THE INVENTION

Cable hangers are commonly used to secure cables to structural members of antenna towers and or along tunnel walls. Generally, each cable is attached to a structural member by cable hangers mounted at periodically-spaced attachment points.

Antenna towers and/or tunnels may be crowded due to the large numbers of cables required for signal-carrying. Over time, as systems are added, upgraded and or expanded, installation a additional cables may be required. To conserve space, it may be desirable for each set of cable hangers to secure more than a single cable. Certain cable hangers have been constructed to secure multiple cables; other cable hangers have a stackable construction that permits multiple cable hangers to be interlocked, extending outwardly from each mounting point/structural member. Stacked and multiple-cable-type cable hangers significantly increase the number of cables mountable to a single attachment point.

One popular stackable cable hanger is discussed in U.S. Pat. No. 8,191,836 to Korczak, the disclosure of which is hereby incorporated herein in its entirety. Hangers disclosed therein have generally a U- or C-shaped profile with rounded arms. A locking projection extends from the free end of each arm, and the "root" of the hanger that spans the fixed ends of the arms has a large aperture. The hanger can hold a cable between the arms; gripping of the cable is enhanced by short fingers that extend inwardly from the arms to engage the cable. Hangers can be "stacked" onto each other by inserting the locking projections of one hanger into the large aperture of the next hanger.

One variety of cable hanger of this type is the SNAP-STAK® hanger, available from CommScope, Inc. (Joliet, Ill.). The SNAP-STAK® hanger is offered in multiple sizes that correspond to the outer diameters of different cables. This arrangement has been suitable for use with coaxial RF cables, which tend to be manufactured in only a few different outer diameters; however, the arrangement has been less desirable for fiber optic cables, which tend to be manufactured in a much greater variety of diameters. Moreover, fiber optic cables tend to be much heavier than coaxial cables (sometimes as much as three times heavier per unit foot), which induces greater load and stress on the hangers.

SUMMARY

As a first aspect, embodiments of the invention are directed to a cable hanger for securing a cable to a supporting structure having an aperture. The cable hanger comprises: a base panel having opposed ends; a pair of arms, each of the arms attached to a respective end of the base panel and having a free end; and a pair of locking projections, each of the locking projections attached to a respective free end of the arms. The arms and locking projections are configured to spread apart to enable insertion of a cable into a space between the arms, and the locking projections are configured to be inserted into the aperture of the supporting structure. The cable hanger further comprises: a pair of tabs extending inwardly from each arm into the space between the arms; and a gripping finger extending generally perpendicularly from each tab and generally tangentially to an outer surface of the cable. Upon insertion of the cable, each tab deflects toward its respective arm, and the gripping fingers engage and grip the cable.

As a second aspect, embodiments of the invention are directed to a cable hanger for securing a cable to a supporting structure having an aperture, the cable hanger comprising: a base panel having opposed ends; a pair of arms, each of the arms attached to a respective end of the base panel and having a free end; and a pair of locking projections, each of the locking projections attached to a respective free end of the arms. The anus and locking projections are configured to spread apart to enable insertion of a cable into a space between the arms, and the locking projections are configured to be inserted into the aperture of the supporting structure. The cable hanger further comprises: a pair of tabs extending inwardly from each arm into the space between the arms; and a gripping finger extending from each tab, wherein each tab includes a ridge that extends inwardly at an angle relative to the gripping finger. Upon insertion of the cable, each tab deflects toward its respective arm, and the gripping fingers engage and grip the cable.

As a third aspect, embodiments of the invention are directed to a cable hanger for securing a cable to a supporting structure having an aperture, the cable hanger comprising: a base panel having opposed ends; a pair of arms, each of the arms attached to a respective end of the base panel and having a free end; and a pair of locking projections, each of the locking projections attached to a respective free end of the arms. The arms and locking projections are configured to spread apart to enable insertion of a cable into a space between the arms, and the locking projections are configured to be inserted into the aperture of the supporting structure. The cable hanger thither comprises: a pair of tabs extending inwardly from the base panel into the space between the arms; and a gripping finger extending generally perpendicularly from each tab and generally tangentially to an outer surface of the cable. Upon insertion of the cable, each tab deflects toward its respective arms and the gripping fingers engage and grip the cable.

DETAILED DESCRIPTION

The present invention is described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used in the below description is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

Figure 1:
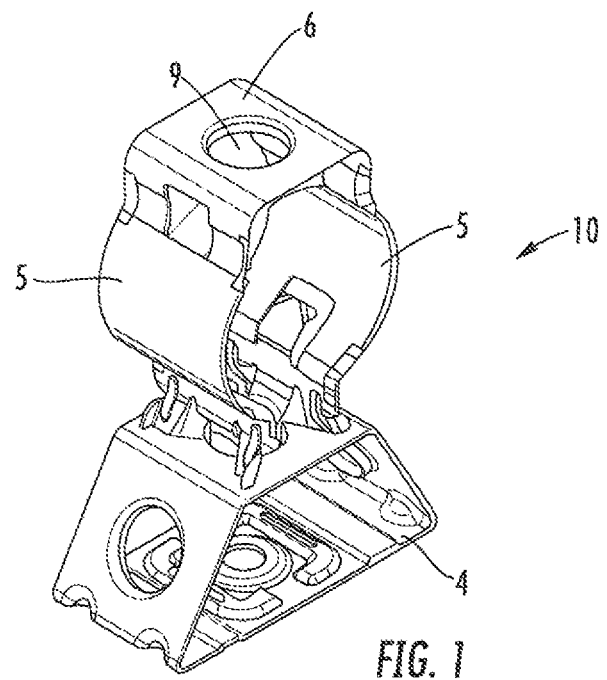
FIG. 1 is a perspective view of a prior art cable hanger.
Figure 2:
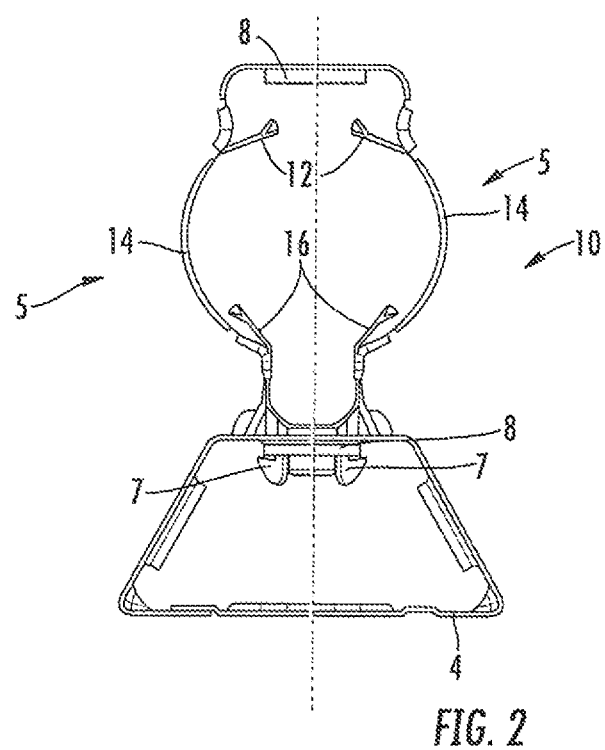
FIG. 2 is a top view of the prior art cable hanger of FIG. 1.

Referring now to the figures, a prior art cable hanger, designated broadly at 10, is shown in FIGS. 1 and 2. The hanger 10 includes curved arms 5 that extend from a flat base 6. Locking projections 7 extend from the free ends of the arms 5. As can be seen in FIGS. 1 and 2, the locking projections 7 are inserted into a reinforced hole 8 in a tower structure 4 to mount the hanger 10 thereon. The base 6 of the hanger 10 includes a reinforced hole 9 that can receive the projections of another hanger 10 to mount a second cable.

As can be best seen in FIG. 2, the arms 5 include arcuate sections 14 that together generally define a circle within which a cable can be grasped. Two cantilevered tabs 12 extend radially inwardly and toward the base 6 at one end of the arcuate sections 14, and two cantilevered tabs 16 extend radially inwardly and toward the base 6 from the opposite ends of the arcuate sections 14. The cantilevered tabs 12, 16 are deployed to deflect radially outwardly when the hanger 10 receives a cable for mounting; this deflection generates a radially inward force from each tab 12, 16 that grips the jacket of the cable.

As discussed above, fiber optic cables tend to be much denser than coaxial cables, and therefore generate a much greater load than coaxial cables of similar diameter. Also, fiber optic cables are currently offered in a larger variety of outer diameters. Accordingly, the hanger 10 may not be suitable for the mounting of some fiber optic cables.

Figure 3:
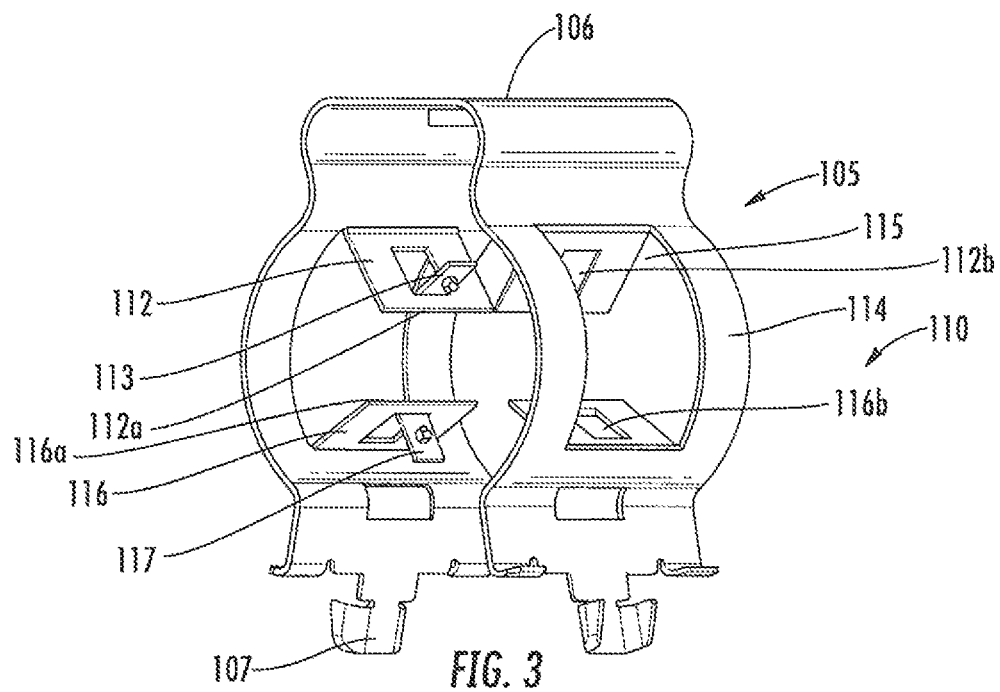
FIG. 3 is a side view of a cable hanger according to embodiments of the invention.
Figure 4:
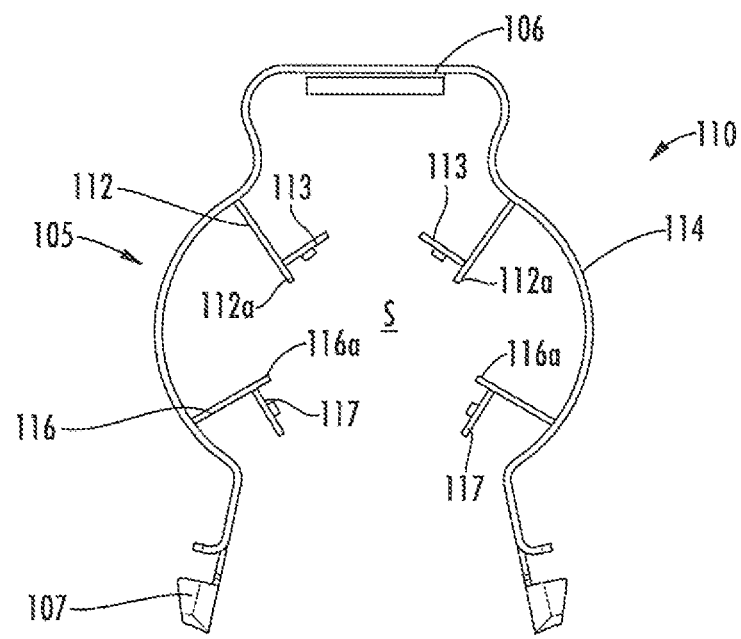
FIG. 4 is a top view of the cable hanger of FIG. 3.

FIGS. 3 and 4 illustrated a cable hanger, designated broadly at 110, that may be more suitable for the mounting of fiber optic cables of varying diameters. The hanger 110 has a base 106, arms 105 and locking projections 107 that are identical or similar to the analogous structures in the hanger 10. However, in the cable hanger 110, tabs 112, 116 extend generally radially inwardly from the arcuate sections 114 of the arms 105. Each of the tabs 112, 116 extends from an edge of an opening 115 in the arcuate section 114. In addition, each of the tabs 112, 116 has a straight gripping finger 113, 117 that extends generally perpendicularly from its corresponding tab 112, 116. The free end of each tab 112, 116 extends slightly beyond its joint with its respective gripping finger 113, 117 to form a ridge 112*a*, 116*a*. Each tab 112, 116 also has a window 112*b*, 116*b*, with the corresponding gripping finger 113, 117 extending from an edge of the corresponding window 112*b*, 116*b*.

As can be envisioned from FIG. 4, the cable hanger 110 can be mounted by slipping a cable between the locking projections 107 and into the space S between the arms 105. As the locking projections 107 are drawn toward each other and inserted into a mounting hole (of either a mounting structure or another cable hanger that is already mounted in place), the gripping fingers 113, 117 engage the jacket of the cable, as do the ridges 112*a*, 116*a*.

When engaging a cable, the cantilevered tabs 112, 116 can be deflected significantly toward the arm 105 on which they are mounted. Also, the gripping fingers 113, 117 can be deflected significantly toward the tab 112, 116 on which they are mounted. As such, the tabs 112, 116 and gripping fingers 113, 117 can enable the cable hanger 110 to accommodate a wide variety of cable diameters.

Also, as the degree to which the tabs 112, 116 are deflected increases, the radially inwardly-directed force increases. Thus, a thicker cable (which presumably would often be heavier than a thinner cable) is subjected to a higher gripping force. This effect is enhanced by the generally perpendicular orientation of the gripping fingers 113, 117; as the cable diameter increases and increases the deflection of the tabs 112, 116, deflection of the gripping fingers 113, 117 relative to the tabs 112, 116 also increases, further enhancing the gripping force.

Additionally, the ridges 112*a*, 116*a* are positioned to "bite" into the cable jacket to provide additional grip on the cable.

Figure 5:
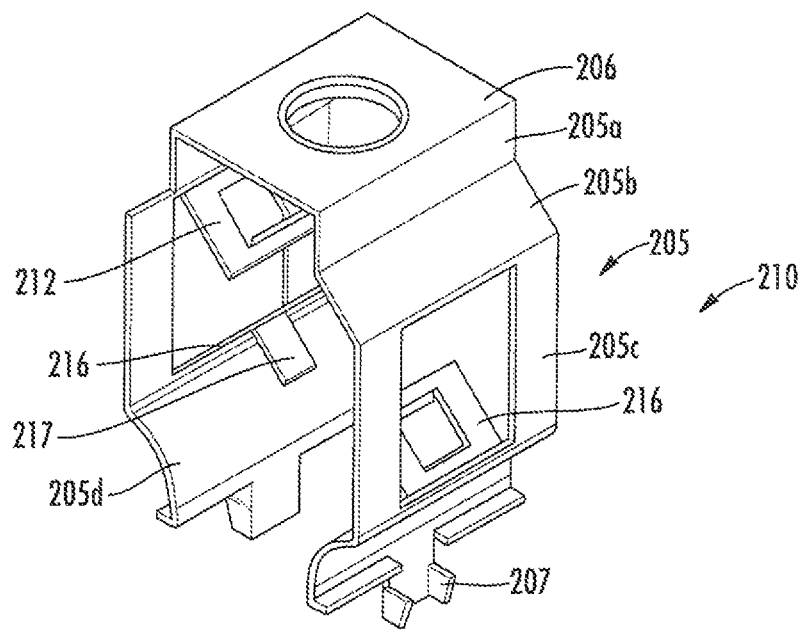
FIG. 5 is a side view of a cable hanger according to alternative embodiments of the invention.
Figure 6:
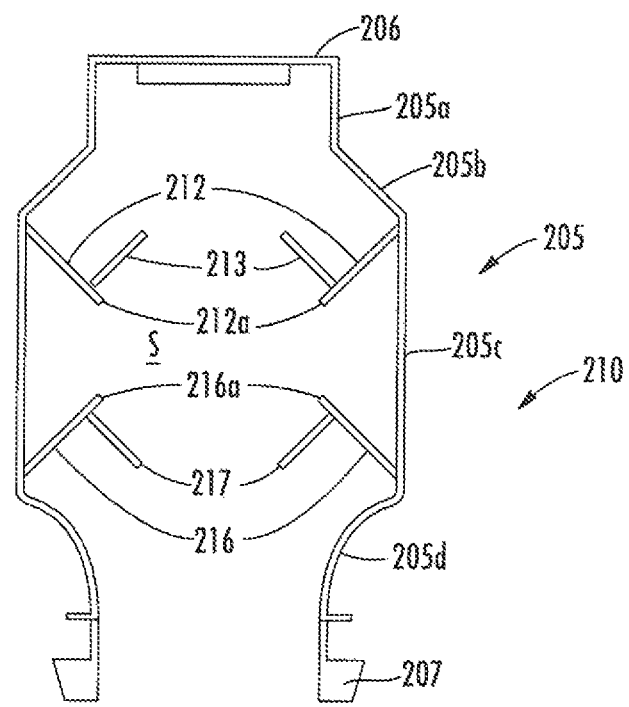
FIG. 6 is a top view of the cable hanger of FIG. 5.

Referring now to FIGS. 5 and 6, another embodiment of a cable hanger, designated broadly at 210, is shown therein. The cable hanger 210 is somewhat similar to the cable hanger 110 in that it includes a base 206, arms 205 and locking projections 207, as well as having gripping fingers 213, 217 mounted on tabs 212, 216. However, the arms 205 of the cable hanger 210 are not smoothly arcuate, but instead include straight sections 205*a*, 205*b*, 205*c* and a curved section 205*d*. Cable hangers having this general configuration of the base, arms and locking projections are discussed in U.S. Provisional Patent Application No. 62/206,558, filed Aug. 18, 2015, the disclosure of which is hereby incorporated herein in its entirety.

The cable hanger 210 is employed in the same manner as the cable hanger 110, with a cable being inserted into the space S between the arms 205 and being gripped by the gripping fingers 213, 217 and the ridges 212*a*, 216*a* of the tabs 212, 216.

Figure 7:
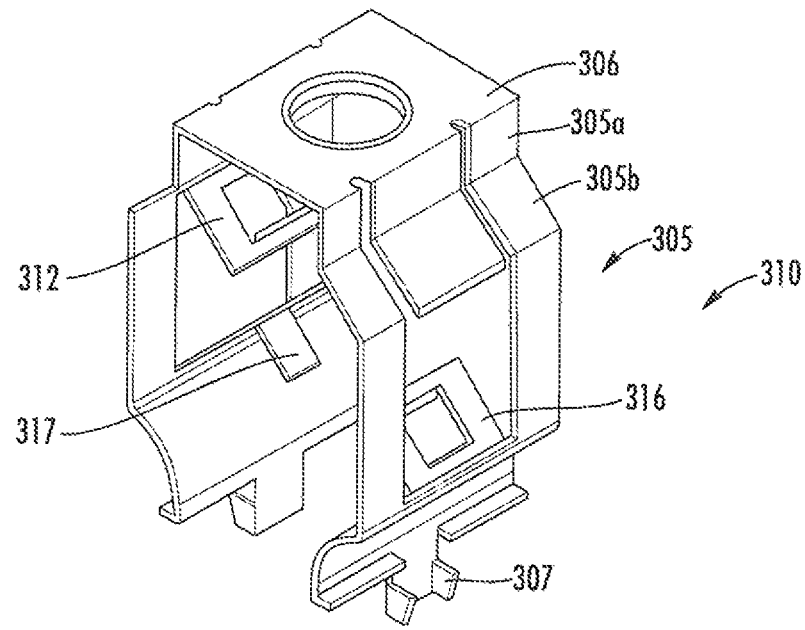
FIG. 7 is a perspective view of a cable hanger according to farther embodiments of the invention.
Figure 8:
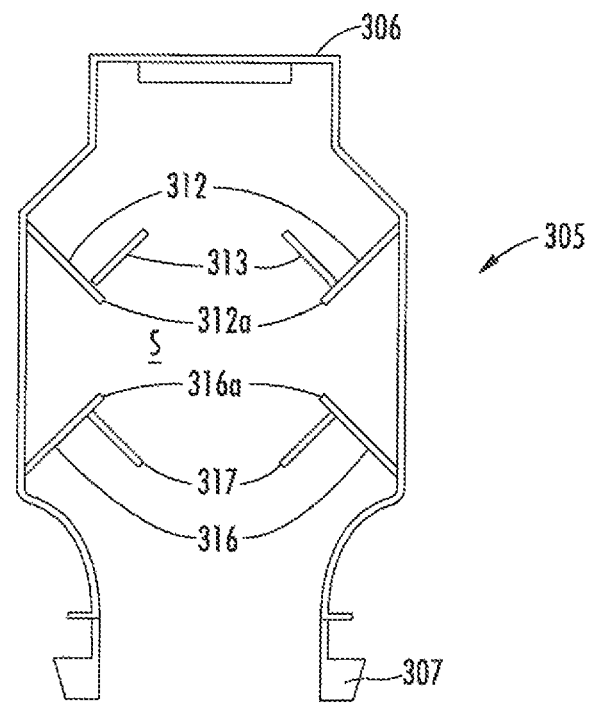
FIG. 8 is a top view of the cable hanger of FIG. 7.

Referring now to FIGS. 7 and 8, another embodiment of a cable hanger, designated broadly at 310, is shown therein. The cable hanger 310 is somewhat similar to the cable hanger 210 in that it includes a base 306, arms 305 and locking projections 307, as well as having gripping fingers 313, 317 mounted on tabs 312, 316. However, the tabs 312 do not extend from the arms 305, but instead originate from the base 306. The tabs 312 are formed to follow the contours of the straight sections 305, 305*b* of the arms 305 before extending into the space S between the arms 305.

The cable hanger 310 is employed in the same manner as the cable hanger 210, with a cable being inserted into the space S between the arms 305 and being gripped by the gripping fingers 313, 317 and the ridges 312*a*, 316*a* of the tabs 312, 316.

Those skilled in this art will appreciate that the cable hangers discussed above are typically formed of a metallic material, such as steel, and may be formed as a unitary member (often from a flat blank stamped from sheet steel and bent into a desired shape). As an example, the openings 115 in the arcuate sections 114 of the arms 105 of the cable hanger 110 are formed when the tabs 112, 116 are bent relative to the arcuate sections 114 during stamping, and the windows 112a, 116a are formed when the gripping fingers 113, 117 are bent relative to the tabs 112, 116 during stamping.

Also, it will be apparent to those of skill in this art that the cable hangers 110, 210, 310 can be arranged in a "stacked" relationship by inserting the locking projections of one cable hanger into the mounting hole in the base of a second cable hanger in the manner described above with respect to cable hanger 10. The second cable hanger may be identical to or different from the first cable hanger as needed for hanging the cable in question.

It should be noted that the gripping fingers of the cable hangers may include gripping features, such as barbs, coined edges, and/or gripping flanges such as those shown in U.S. Provisional Patent Application No. 62/248,460, filed Oct. 30, 2015, the disclosure of which is hereby incorporated herein in its entirety. Also, the gripping fingers are shown as being straight, but may be somewhat curved, bent, angled or the like and still provide sufficient gripping three for use with this invention.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A cable hanger for securing a cable to a supporting structure having an aperture, the cable hanger comprising:
    a base panel having opposed ends;
    pair of arms, each of the arms attached to a respective end of the base panel and having a free end;
    a pair of locking projections, each of the locking projections attached to a respective free end of the arms;
    wherein the arms and locking projections are configured to spread apart to enable insertion of a cable into a space between the arms, and wherein the locking projections are configured to be inserted into the aperture of the supporting structure;
    the cable hanger further comprising:
    a pair of tabs extending inwardly from each arm into the space between the arms; and
    a gripping finger extending generally perpendicularly from each tab and generally tangentially to an outer surface of the cable;
    wherein, upon insertion of the cable, each tab deflects toward its respective arm, and the gripping fingers engage and grip the cable; and
    wherein each arm includes a window with two opposed edges, and wherein the tabs extend from respective ones of the edges.

2. The cable hanger defined in claim 1, wherein each tab includes a ridge that extends inwardly generally perpendicularly to the gripping finger, and wherein the ridges engage and grip the cable.

3. The cable hanger defined in claim 1, wherein each tab includes a window with an edge, and wherein the gripping finger extends from the edge.

4. The cable hanger defined in claim 1, wherein the cable hanger is formed of a metallic material.

5. The cable hanger defined in claim 1, wherein the cable hanger is formed via a stamping operation.

6. The cable hanger defined in claim 1, wherein the cable hanger is formed as a monolithic component.

7. The cable hanger defined in claim 1, wherein the gripping fingers include grip-enhancing features.

8. The cable hanger defined in claim 7, wherein the grip-enhancing features comprise gripping flanges.

9. A cable hanger for securing a cable to a supporting structure having an aperture, the cable hanger comprising:
    a base panel having opposed ends; a pair of arms, each of the arms attached to a respective end of the base panel and having a free end;
    a pair of locking projections, each of the locking projections attached to a respective free end of the arms;
    wherein the arms and locking projections are configured to spread apart to enable insertion of a cable into a space between the arms, and wherein the locking projections are configured to be inserted into the aperture of the supporting structure;
    the cable hanger further comprising:
    a pair of tabs extending inwardly from each arm into the space between the arms; and
    a gripping finger extending from each tab, wherein each tab includes a ridge that extends inwardly at an angle relative to the gripping finger;
    wherein, upon insertion of the cable, each tab deflects toward its respective arm, and the gripping fingers engage and grip the cable;
    wherein the gripping finger extends generally perpendicularly to its corresponding tab and the gripping finger is generally tangential to an outer surface of the cable;
    wherein each tab includes a window with an edge, and wherein the gripping finger extends from the edge;
    and wherein each arm includes a window with two opposed edges, and wherein the tabs extend from respective ones of the edges.

10. The cable hanger defined in claim 9, wherein the cable hanger is formed of a metallic material.

11. The cable hanger defined in claim 10, wherein the cable hanger is formed via a stamping operation.

12. The cable hanger defined in claim 9, wherein the cable hanger is formed as a monolithic component.

13. The cable hanger defined in claim 9, wherein the gripping fingers include grip-enhancing features.

14. The cable hanger defined in claim 13, wherein the grip-enhancing features comprise gripping flanges.

* * * * *

UNITED STATES PATENT AND TRADEMARK OFFICE
CERTIFICATE OF CORRECTION

PATENT NO. : 9,903,510 B2  
APPLICATION NO. : 15/335614  
DATED : February 27, 2018  
INVENTOR(S) : Joshi et al.

Page 1 of 1

It is certified that error appears in the above-identified patent and that said Letters Patent is hereby corrected as shown below:

In the Claims

Column 5, Claim 1, Line 40: Please correct "pair of arms" to read -- a pair of arms --

Signed and Sealed this  
Seventh Day of August, 2018

Andrei Iancu  
*Director of the United States Patent and Trademark Office*